US011997218B2

(12) United States Patent
Manevich et al.

(10) Patent No.: US 11,997,218 B2
(45) Date of Patent: May 28, 2024

(54) DECENTRALIZED, DYNAMIC MEDIA KEY BLOCK FOR BROADCAST ENCRYPTION

(71) Applicant: International Business Machines Corporation, Armonk, NY (US)

(72) Inventors: Yacov Manevich, Beer Sheva (IL); Dulce B. Ponceleon, Palo Alto, CA (US); Petr Novotny, Mount Kisco, NY (US); Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 17/189,757

(22) Filed: Mar. 2, 2021

(65) Prior Publication Data
US 2022/0286299 A1  Sep. 8, 2022

(51) Int. Cl.
*H04L 9/32* (2006.01)
*G06F 21/64* (2013.01)
*H04L 9/00* (2022.01)
*H04L 9/06* (2006.01)

(52) U.S. Cl.
CPC ............ *H04L 9/3255* (2013.01); *G06F 21/64* (2013.01); *H04L 9/0637* (2013.01); *H04L 9/3239* (2013.01); *H04L 9/50* (2022.05)

(58) Field of Classification Search
CPC ... H04L 9/3255; H04L 9/0637; H04L 9/3239; H04L 9/50; G06F 21/64
See application file for complete search history.

(56) References Cited

U.S. PATENT DOCUMENTS

| 7,039,803 | B2 | 5/2006 | Lotspiech | |
| 8,108,928 | B2 | 1/2012 | Jin | |
| 8,468,244 | B2 | 6/2013 | Redlich | |
| 10,158,894 | B2 | 12/2018 | Nair | |
| 10,289,809 | B1* | 5/2019 | Hesselink | H04N 21/4627 |

(Continued)

FOREIGN PATENT DOCUMENTS

| CN | 109547818 A | 3/2019 |
| CN | 110098919 A | 8/2019 |

(Continued)

OTHER PUBLICATIONS

"Notification of Transmittal of the International Search Report and the Written Opinion of the International Searching Authority, or the Declaration", From the International Searching Authority, International application No. PCT/CN2021/132219, Date of Mailing: Feb. 14, 2022, 8 pgs.

(Continued)

*Primary Examiner* — Taghi T Arani
*Assistant Examiner* — Blake I Narramore
(74) *Attorney, Agent, or Firm* — Kristofer L. Haggerty

(57) ABSTRACT

A processor may segment a media key block into two or more subsets. Each of the two or more subsets may be respectively associated with a particular group of receivers, and each receiver of the particular group of receivers may be in a blockchain network. The processor may receive, from a first receiver, a request for permission to process the media key block. The processor may identify which of the two or more subsets that the first receiver is associated. The processor may provide a media key block value to the first receiver.

20 Claims, 10 Drawing Sheets

(56) References Cited

U.S. PATENT DOCUMENTS

| | | | |
|---|---|---|---|
| 10,306,308 B2 | 5/2019 | Nair | |
| 10,567,168 B2 | 2/2020 | Garagiola | |
| 10,951,958 B1* | 3/2021 | Arana | H04N 21/8358 |
| 11,139,955 B1* | 10/2021 | So | G06Q 20/3674 |
| 11,275,865 B2* | 3/2022 | Xu | G06F 21/31 |
| 2013/0275755 A1* | 10/2013 | Ignatchenko | H04N 21/4408 713/168 |
| 2015/0110274 A1 | 4/2015 | Ponceleon | |
| 2016/0171186 A1* | 6/2016 | Marking | H04L 9/0894 713/189 |
| 2017/0063558 A1 | 3/2017 | Jin | |
| 2017/0251254 A1* | 8/2017 | Lotspiech | G06F 21/10 |
| 2018/0293363 A1* | 10/2018 | Asati | G06F 21/12 |
| 2018/0322489 A1* | 11/2018 | Altenhofen | G06Q 20/40 |
| 2019/0130128 A1* | 5/2019 | Khassanov | H04L 63/101 |
| 2019/0158481 A1 | 5/2019 | Ronda | |
| 2019/0165930 A1* | 5/2019 | Castinado | H04L 9/3239 |
| 2019/0394175 A1 | 12/2019 | Zhang | |
| 2020/0320518 A1 | 10/2020 | Simas | |
| 2020/0380090 A1* | 12/2020 | Marion | H04L 9/3239 |
| 2021/0065070 A1 | 3/2021 | Augustine | |
| 2021/0067328 A1* | 3/2021 | Verheyen | H04L 9/0861 |
| 2021/0349967 A1* | 11/2021 | Palyutina | H04N 21/4627 |
| 2022/0050858 A1* | 2/2022 | Karr | G06F 11/3466 |
| 2022/0182231 A1 | 6/2022 | Ponceleon | |

FOREIGN PATENT DOCUMENTS

| | | |
|---|---|---|
| CN | 110581839 A | 12/2019 |
| CN | 116671060 A | 8/2023 |
| DE | 112021005837 T5 | 8/2023 |
| WO | 2022121673 A1 | 6/2022 |

OTHER PUBLICATIONS

Adsumilli, P., et al., "DGKD: Distributed group key distribution with authentication capability." Proceedings from the Sixth Annual IEEE SMC Information Assurance Workshop, West Point, NY, USA, 2005, pp. 286-293. https://ieeexplore.ieee.org/document/1495965.

Amin, M., "Blockchain-VXLAN." Published Aug. 16, 2017. 8 pages. Published by IP.com. https://ip.com/IPCOM/000250654.

Anonymous. "Certificate Transparency." Accessed Dec. 8, 2020. 3 pages. http://www.certificate-transparency.org/.

Anonymous. "Including URL to Media Key Block in Encrypted Content Header." Published Sep. 3, 2004. 8 pages. Published by IP.com. https://ip.com/IPCOM/000030992.

Anonymous. "Method and Apparatus of Decentralized, Secure, and Private Service Container Hosted in Blockchain Network." Published Aug. 23, 2020. 3 pages. Published by IP.com. https://ip.com/IPCOM/000263354.

Anonymous. "Pearl TV." Accessed Oct. 7, 2020. 6 pages. Published by Pearl TV. https://pearltv.com/.

Anonymous. "Share the Vision." Accessed Oct. 7, 2020. 1 page. Published by AACS LA, LLC. https://aacsla.com/.

Asano, T., "A Revocation Scheme with Minimal Storage at Receivers." ASIACRYPT '02: Proceedings of the 8th International Conference on the Theory and Application of Cryptology and Information Security: Advances in Cryptology, Dec. 2002, pp. 433-450. https://iacr.org/archive/asiacrypt2002/25010432/25010432.pdf.

Bhattacherjee, S., et al., "Reducing Communication Overhead of the Subset Difference Scheme." IEEE Transactions on Computers, vol. 65, No. 8, pp. 2575-2587, Aug. 1, 2016. Published by IEEE. https://ieeexplore.ieee.org/document/7286803?section=abstract.

Bhattacherjee, S., et al., "Tree based symmetric key broadcast encryption." Journal of Discrete Algorithms, vol. 34, Sep. 2015, pp. 78-107. https://doi.org/10.1016/j.jda.2015.05.010.

Fiat, A., et al., "Broadcast Encryption." Published Jan. 1993. Conference: Advances in Cryptology—Crypto '93, 13th Annual International Cryptology Conference, Santa Barbara, California, USA, Aug. 22-26, 1993. Published by Springer. https://doi.org/10.1007/0-387-30038-4_15.

Ganesh, C., et al., "Virtual ASICs: Generalized Proof-of-Stake Mining in Cryptocurrencies." Published Jun. 25, 2020. 17 pages. Published by IACR. https://eprint.iacr.org/2020/791.

Jin, et al., "Broadcast Encryption for Differently Privileged." Published May 2009. 13 pages. Emerging Challenges for Security, Privacy and Trust, 24th IFIP TC 11 International Information Security Conference, SEC 2009. https://www.researchgate.net/publication/220722750.

Liu, S., et al., "BC-SABE: Blockchain-aided Searchable Attribute-based Encryption for Cloud-IoT." Published May 8, 2020. 17 pages. IEEE Internet of Things Journal, vol. 7, Issue 9, pp. 7851-7867 (2020). Published by IEEE. https://ieeexplore.ieee.org/document/9090206.

Malluhi, et al., "Decentralized Broadcast Encryption Schemes with Constant Size Ciphertext and Fast Decryption." Published Jun. 6, 2020. 19 pages. Symmetry 2020, 12, 969; doi:10.3390/sym12060969.

Mell, et al., "The NIST Definition of Cloud Computing," Recommendations of the National Institute of Standards and Technology, U.S. Department of Commerce, Special Publication 800-145, Sep. 2011, 7 pgs.

Naor, D., et al., "Revocation and Tracing Schemes for Stateless Receivers." Published Jul. 2001. 34 pages. Published by IACR. https://iacr.org/archive/crypto2001/21390040.pdf.

Phan, et al., "Decentralized Dynamic Broadcast Encryption." Published Sep. 2012. 23 pages. Proceedings of 8th Conference on Security and Cryptography for Networks (SCN 2012). Published by Springer.

Ponceleon et al., "Decentralized Broadcast Encryption and Key Generation Facility," U.S. Appl. No. 17/116,834, filed Dec. 9, 2020.

Roy-Chowdhury, A., et al., "Key management for secure multicast in hybrid satellite networks." Security and Protection in Information Processing Systems. SEC 2004. IFIP—The International Federation for Information Processing, vol. 147. Springer, Boston, MA. https://doi.org/10.1007/1-4020-8143-X_35.

Shamir, A., "How to Share a Secret." 2 pages. Communications of the ACM, vol. 22, Issue 11. Nov. 1979. Published by ACM. https://doi.org/10.1145/359168.359176.

Strefler, M., "Broadcast Encryption with Traitor Tracing." Published Oct. 8, 2013. 149 pages. Cryptography and Security [cs.CR]. Ecole Normale Superieure de Paris—ENS Paris. https://tel.archives-ouvertes.fr/tel-00870910.

Wang, S., et al., "Balanced double subset difference broadcast encryption scheme." Published Aug. 5, 2014. 14 pages. Security and Communication Networks, vol. 8, Issue 8, pp. 1447-1460. https://doi.org/10.1002/sec.1093.

Wikipedia, "ATSC Standards." Accessed Oct. 7, 2020. 17 pages. Published by Wikipedia. https://en.wikipedia.org/wiki/ATSC_standards.

IBM: List of IBM Patents or Patent Applications Treated as Related. Filed Herewith. 2 pages.

* cited by examiner

DECENTRALIZED, DYNAMIC MEDIA KEY BLOCK FOR BROADCAST ENCRYPTION

BACKGROUND

The present disclosure relates generally to the field of digital media, and more specifically to decentralizing media key blocks utilized for broadcast encryption.

Broadcast encryption is a technology that broadcasts a message/content (e.g., digital media) among a group of users (e.g., receivers, target users, etc.) using a tree of keys and a tree subset-difference (or subset-cover [SC]) scheme. Currently, the practical implementation and deployment of broadcast encryption involves multiple entities, which in-turn makes end-to-end security essential.

SUMMARY

Embodiments of the present disclosure include a method, system, and computer program for a dynamic media key block. A processor may segment a media key block into two or more subsets. Each of the two or more subsets may be respectively associated with a particular group of receivers, and each receiver of the particular group of receivers may be in a blockchain network. The processor may receive, from a first receiver, a request for permission to process the media key block. The processor may identify which of the two or more subsets that the first receiver is associated. The processor may provide a media key block value to the first receiver.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
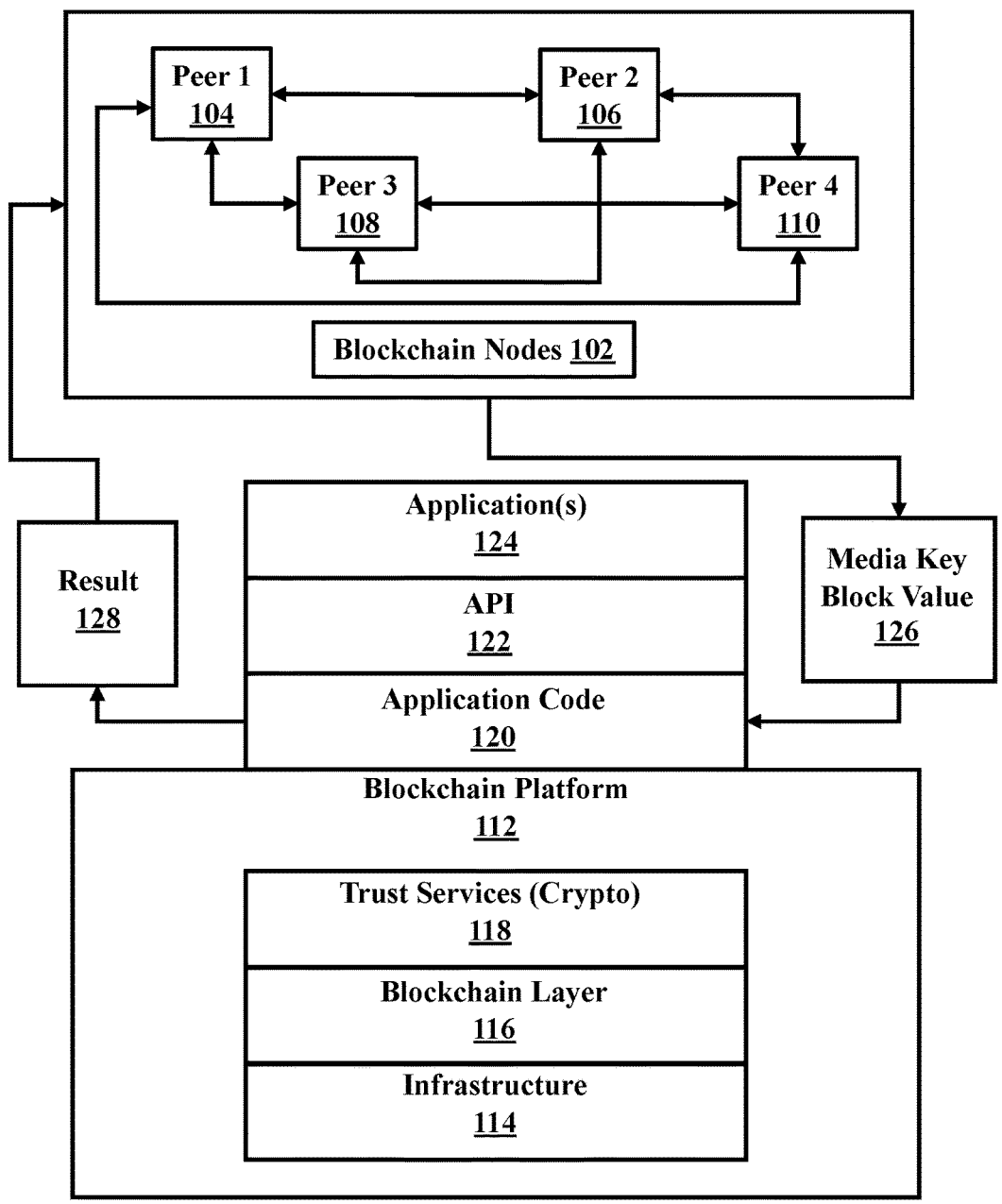
FIG. 1A illustrates an example blockchain architecture, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of digital media, and more specifically to decentralizing media key blocks utilized for broadcast encryption. Broadcast encryption is a technology that broadcast a message/content (e.g., media, digital media, etc.) among a group of users (e.g., receivers, peers, nodes, target users, etc.) using a tree of keys and a tree subset-difference (or subset-cover [SC]) scheme. Broadcast encryption's main components are: a membership management module that deals with registered/authorized users and groups; a content encryption module, which may work with oversight from a content provider, and which encrypts session keys (and possibly media content itself) for a target set of users; authorized user/groups that are authorized to access content; and a revocation management module, which could be the same component as the membership management module or which may be a separate component that restricts unauthorized users/groups from accessing content.

Naor, Naor, Lotspiech (NNL) proposed a Subset Difference (SSD) and it is one of the most popular implementations of broadcast encrypting. NNL is an efficient implementation of broadcast encryption that uses a binary tree and which provides optimal coverage on a number of subset-covers (e.g., as will be discussed more fully in regard to FIG. 2C). That is, a minimum size of metadata of a denoted media key block is needed to decrypt content. Many broadcast encryption schemes have been proposed and their main goal has been to decrease private key size, ciphertext size, public key size, and computational cost for encryption and decryption.

However, the practical implementation and deployment of broadcast encryption involves multiples entities, and providing end-to-end security is essential, which is a difficult task because it requires agreement from entities for sensitive operations, renewability, and timely updates; and specialized personnel for operations facility, and effective forensics (e.g., is content being used by unauthorized users).

Accordingly, proposed herein is a solution to the problems discussed above, where a media key block is leveraged by a blockchain, which in turn enables: on-demand, real-time and near real-time media key block updates; timely compliant modifications/substitutions of the media key block; Generation of smaller or the smallest media key block that works for a user; media key block modifications and/or media key block processing protocol(s) to provide forensic capabilities on its own; a second 'line of defense'—content variants, or content watermark. Using tree topology/coverage in combination with variants/watermarks for forensics; and tree topology, specific key derivation, and user number (e.g. node #) can be use as identifiers.

As will be discussed throughout this disclosure, due to the proposed solution, unlike traditional broadcast encryption a media key block does not necessarily have the key to decrypt a message/content. Instead additional information is needed, which is provided by a blockchain transaction. Further, from the disclosed solution, creation of forensic media key blocks lead to a more efficient tracing of unauthorized users with broadcast encryption, thus less iterations media key block updates are needed (e.g., tracing iterations do not have to wait for periodic media key block updates).

Even more, the number of different media key block topology (e.g., fingerprint) is not limited, which is in contrast with variations on physical media. Further, as disclosed herein, one can keep track of times content is decrypted and which user or group of users tries to access a content or asks for information from a media key block (e.g., as the access is recorded in a blockchain).

As will be shown throughout this disclosure, broadcast encryption works well when a number of revoked users is small relative to the total number of users, i.e., a large media key block; and generation of a smaller media key block can be enabled by blockchain where user devices have internet-of-things (IoT) applications, media applications (e.g., movies—physical or streamed), etc. Thus, leveraging blockchain in regard to media key blocks establishes a dynamic media key block that provides enhanced functionality that can be incorporated (a) in a decentralized broadcast encryption framework; or (b) on its own, e.g., the dynamic element enabled by a blockchain transaction and key generation facility (KGF) off the blockchain ledger.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein are a method, system, and computer program product that decentralizes media key blocks for broadcasting encryption.

In some embodiment, the method, system, and/or computer program product utilize a decentralized database (such as a blockchain) that is a distributed storage system, which includes multiple nodes that communicate with each other. The decentralized database may include an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public, or permission-less, blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal but which do not fully trust one another, such as businesses that exchange funds, goods, (private) information, and the like.

Further, in some embodiment, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode (such as managing media key block values for subset groups of receivers/peers/nodes/ etc.). In some embodiments, the method, system, and/or computer program product can further utilize smart contracts that are trusted distributed applications which leverage tamper-proof properties of the blockchain database and an underlying agreement between nodes, which is referred to as an endorsement or endorsement policy.

An endorsement policy allows chaincode to specify endorsers for a transaction in the form of a set of peer nodes that are necessary for endorsement. When a client sends the transaction to the peers (e.g., endorsers) specified in the endorsement policy, the transaction is executed to validate the transaction. After validation, the transactions enter an ordering phase in which a consensus protocol is used to produce an ordered sequence of endorsed transactions grouped into blocks.

In some embodiment, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node).

Another type of node is a peer node which can receive client submitted transactions, commit the transactions, and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing/confirming transactions and modifying a world state of the blockchain, which is another name for the initial blockchain transaction which normally includes control and setup information.

In some embodiment, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database that maintains a current state of the blockchain.

In some embodiment, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated) upon peer node startup, and before transactions are accepted.

Some benefits of the instant solutions described and depicted herein include a method, system, and computer program product for decentralizing media key blocks for broadcast encryption. The exemplary embodiments solve the issues of data protection (discussed above) as they relate to media/digital media.

It is noted that blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the blockchain ledger data is immutable, which provides for an efficient method for decentralizing media key blocks for broadcast encryption. Also, use of the encryption in the blockchain provides security and builds trust. The smart contract manages the state of the asset(s) to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set, and write-set. In other words, the blockchain inherent features provide for efficient implementation of broadcast encryption.

One of the benefits of the example embodiments is that it improves the functionality of a computing system by implementing a method for decentralizing media key blocks for broadcast encryption (e.g., by piecemealing the media key block into two or more values that are respectively used by a subset of receivers/peers). As such, it is noted that the blockchain is not just a database; the blockchain comes with capabilities to create a network of users and to on-board/off-board organizations/entities/users to collaborate and execute service processes in the form of smart contracts (which may be associated with media/digital media).

The example embodiments provide numerous benefits over a traditional database. For example, through the blockchain, the embodiments provide for immutable accountability, security, privacy, permitted decentralization, availability of smart contracts, endorsements and accessibility that are inherent and unique to the blockchain.

Meanwhile, a traditional database could not be used to implement the example embodiments because it does not bring all parties on the network, it does not create trusted collaboration and does not provide for an efficient commitment of transactions involving media/digital media content access. The traditional database does not provide for tamper proof storage and does not provide for preservation of content access included in a transaction. Thus, the proposed embodiments described herein utilizing blockchain networks cannot be implemented by the traditional database.

Meanwhile, if a traditional database were to be used to implement the example embodiments, the example embodiments would have suffered from unnecessary drawbacks such as lack of security and slow data recovery. Accordingly, the example embodiments provide for a specific solution to a problem in the arts/field of broadcast encryption and/or media key block generation.

Turning now to FIG. 1A, illustrated is a blockchain architecture 100, in accordance with embodiments of the present disclosure. In some embodiments, the blockchain architecture 100 may include certain blockchain elements, for example, a group of blockchain nodes 102. The blockchain nodes 102 may include one or more blockchain nodes, e.g., peers 104-110 (these four nodes are depicted by example only). These nodes participate in a number of activities, such as a blockchain transaction addition and validation process (consensus). One or more of the peers 104-110 may endorse and/or recommend transactions based on an endorsement policy and may provide an ordering service for all blockchain nodes 102 in the blockchain architecture 100. A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions such as encryption and key generation and to keep information private.

The blockchain architecture 100 of FIG. 1A may process and execute program/application code 120 via one or more interfaces exposed, and services provided, by blockchain platform 112. The application code 120 may control blockchain assets. For example, the application code 120 can store and transfer data, and may be executed by peers 104-110 in the form of a smart contract and associated chaincode with conditions or other code elements subject to its execution. As a non-limiting example, smart contracts may be generated to execute the transfer of assets/resources (e.g., transfer of a session key, media key value, etc.), the generation of assets/resources, etc. The smart contracts can themselves be used to identify rules associated with authorization (e.g., asset transfer rules, restrictions, encryption/key generation, etc.), access requirements (e.g., of a datastore, of an off-chain datastore, of who may participate in a transaction [access content of a media/the media], etc.), and/or usage of the ledger. For example, the media key block value 126 (e.g., value to be used by a particular group of receivers as a key for accessing content of a media) may be processed by one or more processing entities (e.g., virtual machines) included in the blockchain layer 116. The result 128 may include a plurality of linked shared documents (e.g., with each linked shared document recording the issuance of a smart contract in regard to the media key block value 126 being issued and/or denied). In some embodiments, the physical infrastructure 114 may be utilized to retrieve any of the data/information/assets/etc. described herein.

A smart contract may be created via a high-level application and programming language, and then written to a block in the blockchain. The smart contract may include executable code which is registered, stored, and/or replicated with a blockchain (e.g., a distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., thus committing an access of a media to the blockchain, etc.).

Figure 1B:
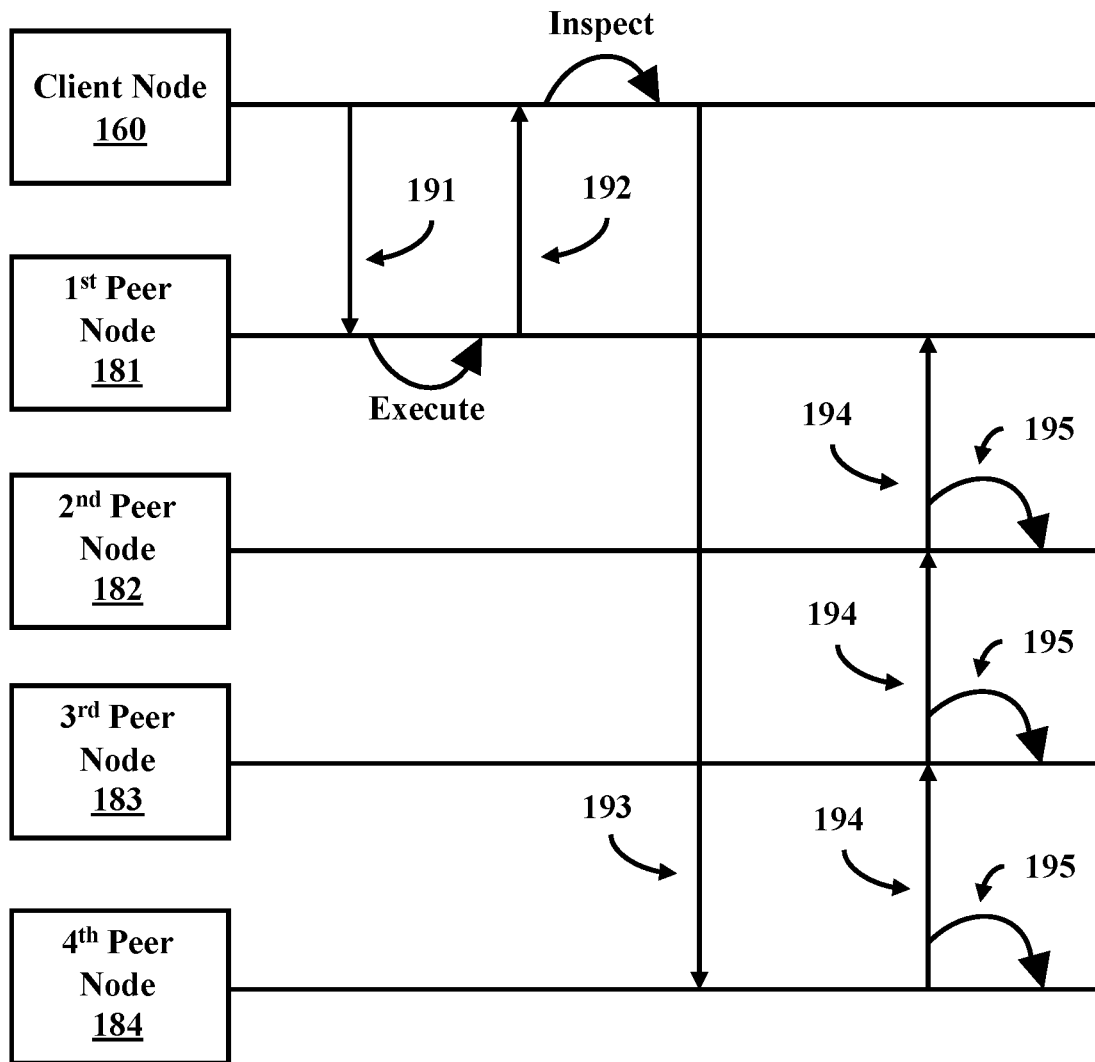
FIG. 1B illustrates a blockchain transactional flow, in accordance with embodiments of the present disclosure.

FIG. 1B illustrates an example of a blockchain transactional flow 150 between nodes of the blockchain in accordance with an example embodiment. Referring to FIG. 1B, the transaction flow may include a transaction proposal 191 sent by an application client node 160 to an endorsing peer node 181. The endorsing peer 181 may verify the client signature and execute a chaincode function to initiate the transaction. The output may include the chaincode results, a set of key/value versions that were read in the chaincode (read set), and the set of keys/values that were written in chaincode (write set). The proposal response 192 is sent back to the client 160 along with an endorsement signature, if approved. The client 160 assembles the endorsements into a transaction payload 193 and broadcasts it to an ordering service node 184. The ordering service node 184 then delivers ordered transactions as blocks to all peers 181-183 on a channel. Before committal to the blockchain, each peer 181-183 may validate the transaction. For example, the peers may check the endorsement policy to ensure that the correct allotment of the specified peers have signed the results and authenticated the signatures against the transaction payload 193.

Referring again to FIG. 1B, the client node 160 initiates the transaction 191 by constructing and sending a request to the peer node 181, which in this example is an endorser. The client 160 may include an application leveraging a supported software development kit (SDK), which utilizes an available API to generate a transaction proposal 191. The proposal is a request to invoke a chaincode function so that data can be read and/or written to the ledger. The SDK may reduce the package of the transaction proposal 191 into a properly architected format (e.g., protocol buffer over a remote procedure call (RPC)) and take the client's cryptographic credentials to produce a unique signature for the transaction proposal 191.

In response, the endorsing peer node 181 may verify (a) that the transaction proposal 191 is well formed, (b) the transaction has not been submitted already in the past (replay-attack protection), (c) the signature is valid, and (d) that the submitter (client 160, in the example) is properly authorized to perform the proposed operation on that channel. The endorsing peer node 181 may take the transaction proposal 191 inputs as arguments to the invoked chaincode function. The chaincode is then executed against a current state database to produce transaction results including a response value, read set, and write set. However, no updates are made to the ledger at this point. In some embodiments, the set of values, along with the endorsing peer node's 181 signature is passed back as a proposal response 192 to the SDK of the client 160 which parses the payload for the application to consume.

In response, the application of the client 160 inspects/verifies the endorsing peers signatures and compares the proposal responses to determine if the proposal response is the same. If the chaincode only queried the ledger, the application would inspect the query response and would typically not submit the transaction to the ordering node service 184. If the client application intends to submit the transaction to the ordering node service 184 to update the ledger, the application determines if the specified endorsement policy has been fulfilled before submitting. Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in the transaction payload step 193, the client 160 assembles endorsements into a transaction and broadcasts the transaction proposal 191 and response within a transaction message to the ordering node 184. The transaction may contain the read/write sets, the endorsing peers signatures and a channel ID (e.g., if a specific [off-chain] datastore is to be utilized, etc.). The ordering node 184 does not need to inspect the entire content of a transaction in order to perform its operation, instead the ordering node 184 may simply receive transactions from all channels in the network, order them chronologically by channel, and create blocks of transactions per channel.

The blocks of the transaction are delivered from the ordering node 184 to all peer nodes 181-183 on the channel. The transactions 194 within the block are validated to ensure any endorsement policy is fulfilled and to ensure that there have been no changes to ledger state for read set variables since the read set was generated by the transaction execution. Transactions in the block are tagged as being valid or invalid. Furthermore, in steps 195 each peer node 181-183 appends the block to the channel's chain, and for each valid transaction the write sets are committed to current state database. An event is emitted, to notify the client application that the transaction (invocation) has been immutably appended to the chain, as well as to notify whether the transaction was validated or invalidated (e.g., access to the media/content of the media was allowed/disallowed and/or confirmed/unconfirmed a particular receiver is to have a specific media key value and/or access to a media).

Figure 2A:
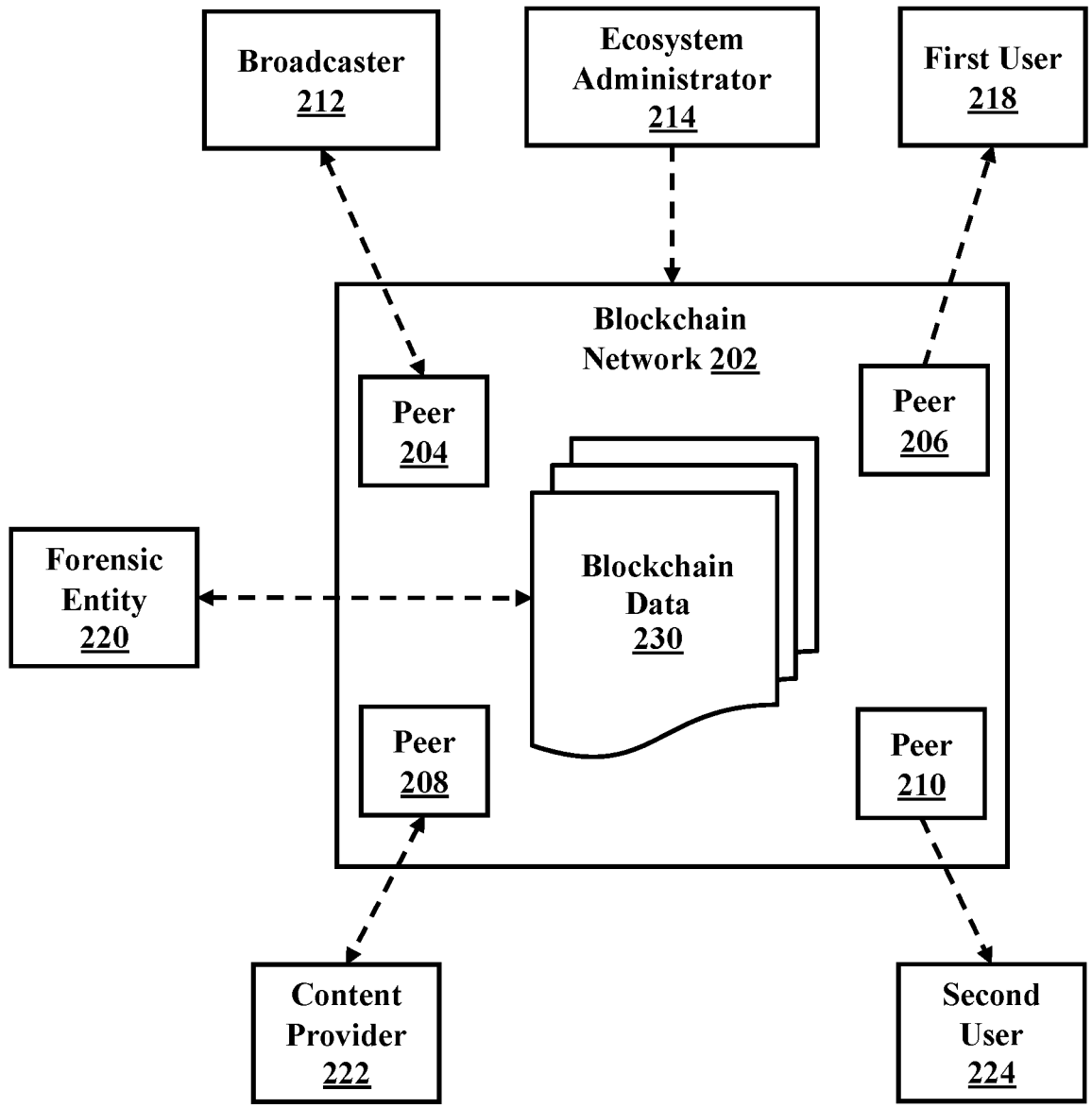
FIG. 2A illustrates an example of a broadcasting protocol, in accordance with embodiments of the present disclosure.

Referring now to FIG. 2A, illustrated is an example of a broadcasting protocol 200, in accordance with embodiments of the present disclosure. As depicted, the broadcasting protocol 200 includes a blockchain network 202, a broadcaster 212, an ecosystem administrator 214, a first user 218, a forensic entity 220, a content provider 222, and a second user 224. In some embodiments, the blockchain network 202 includes peers 204, 206, 208, and 210, and blockchain data 230 (which will be discussed more fully in regard to FIG. 2B).

In some embodiments, the blockchain network 202 (a) manages tree resource allocation; (b) processes media key block associated data (e.g., specific coverage, specific session keys, specific content keys, user IDs, revocation changes, and authorized/unauthorized users); (c) generation of coverage (how many receivers in a group); (d) manages forensics (e.g., generates and assigns variants of content to identify if content has been improperly used).

In some embodiments, the broadcaster 212 and/or the content provider 222 may perform the functions of (a) receiving/providing the latest coverage of information (e.g., keys, media key block data, etc.) needed for either users 218, 224 or peers 204-210 to access media content; (b) receiving content that will be distributed to either users 218, 224 or peers 204-210; (c) encrypting the content; and (d) distributing the content to either users 218, 224 or peers 204-210. It is noted that, in embodiments, the broadcaster 212 and the content provider 222 may be the same or substantially similar to one another. In other embodiments, as depicted, the content provider 222 may provide the media content to be broadcast by the broadcaster 212.

In some embodiments, the forensic entity 220 is an entity/module/component that contains revocation information and identifies and records vulnerabilities (e.g., the forensic entity identifies which receiver should not have access to media content and/or records information on receivers that could be trying to access the media content while being unauthorized). It is noted that the forensic entity 220 and the blockchain network 202 are components not provided in a traditional broadcasting protocol.

In some embodiments, the ecosystem administrator 214 my hold a repository of all authorized users that can access the media content. In some embodiments, the first user 218 and the second user 224 and/or their associated peers 206 and 210 may be provided/(pre)-provisioned with keys that, if they are non-revoked can decrypt broadcasted media content.

In some embodiments, the ecosystem administrator 214 provides a tree/resource schema, a user (e.g., consumer, customer) management policy/schema, an agreement on policy (e.g., who has access to content), and a business (e.g., pricing) model to the blockchain network 202. In some embodiments, the ecosystem administrator 214 may receive such schemas, policies, and models from the either or both the broadcaster 212 and the content provider 222.

In some embodiments, after the ecosystem administrator 214 provides the aforementioned information to the blockchain network 202, the forensic entity 220 utilizes said information and comprises one or more lists of compromised keys, content variants, users/peers to be revoked, information for coverage computation (e.g., which group of receivers are associated with what media key block value). In some embodiments, the forensic entity 220 provides the lists to the blockchain network 202.

In some embodiments, either one or both of the broadcaster 212 and the content provider 222 submits a transaction to the blockchain network 202 via their respective peers 204 and/or 208 (it is noted that any of the peers 204-210 may be any computing device). That is, the broadcaster 212 and the content provider 222 provide to the blockchain network 202 which users are supposed to get which keys and/or media key block values. Upon the submission of the transaction, the peers 206 and 210 respectively associated with the first user 218 and the second user 224 are provided with their respective provisioned keys (e.g., to decrypt the media key block [value]), and/or the media key block.

In some embodiments, after the first user 218 and the second user 224 and/or their respective peers 206 and 210 are provided their provisioned keys, the broadcaster 212 and/or the content provider 222 may update which users and/or peers are under which coverage, the key to encrypt the media content, and/or their content variants.

In some embodiments, after the broadcasting protocol 200 is initiated, the users 218 and 224 via their peers 206 and 210 may initiate their own transaction (not depicted) where they ask for permission to access a media content and if their provisioned key can decrypt a correct media key block value (e.g., information in regard to the media key block), the users 218 and 224 may be able to view the content on their respective peers 206 and 210.

Figure 2B:
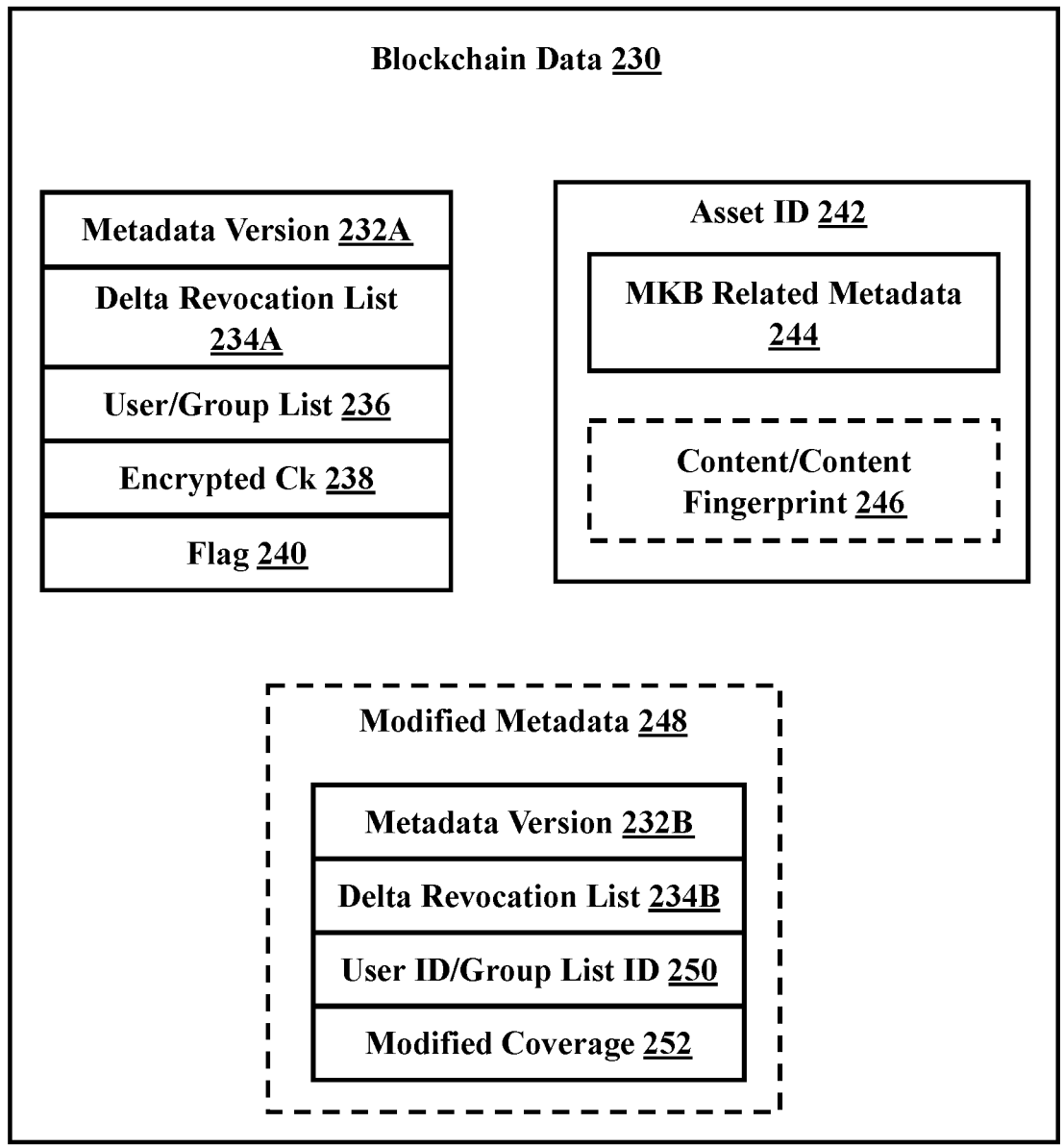
FIG. 2B illustrates an example of blockchain data, in accordance with embodiments of the present disclosure.

Turning now to FIG. 2B, illustrated is an example of the blockchain data 230, in accordance with embodiments of the present disclosure. In some embodiments, the blockchain data 230 includes: metadata versions 232A-B, which are used by each receiver to check if it needs to request an updated media key block or an updated revocation list; delta revocation lists 234A-B, which, in some embodiments, are optional fields that include one or more revocation changes (deltas) over a baseline version (of the content, media key block, keys, etc.); a user/group list 236, which, in some embodiments, is an optional field to provide an explicit list of targeted compliant users and which is potentially smaller and a finer grain than traditional coverage (as will be discussed in regard to FIG. 2C where the smaller triangles indicate groups of receivers); an encrypted content key (Ck) 238, which is encrypted with subset difference (SD) key, where a SD is a subset difference coverage including only compliant users/receivers; a flag 240, where the flag 240 is a not-self-contained flag that may be an optional flag to indicate if additional information (e.g., transaction) is needed to fully process metadata to decrypt media content; an asset ID 242, and, in some embodiments, modified metadata 248.

In some embodiments, the modified metadata may be an update or a variant of the information in the blockchain data 230. As depicted, modified metadata 248 includes metadata version 232B, delta revocation list 234B, user ID/Group list ID 250, and modified coverage 252. It is noted that metadata version 232B, delta revocation list 234B may be the same or altered versions of the metadata version 232A, delta revocation list 234A. In some embodiments, the user ID/Group list ID 250 includes updated information on authorized users (e.g., who can access media content. In some embodiments, the modified coverage 252 includes an update/alteration to which users and/or receivers are now in a particular group of users and which can use a particular media key block value. In some embodiments, the modified metadata 248 may include an optional flag.

In some embodiments, the asset ID 242 includes media key block (MKB) related metadata 244 that is used for gaining access to media content associate with the asset ID 242. In some embodiments, the asset ID 242 can optionally include the (media) content/content fingerprint 246, which is the media content or a pointer that would allow access to the content by an authorized user.

Figure 2C:
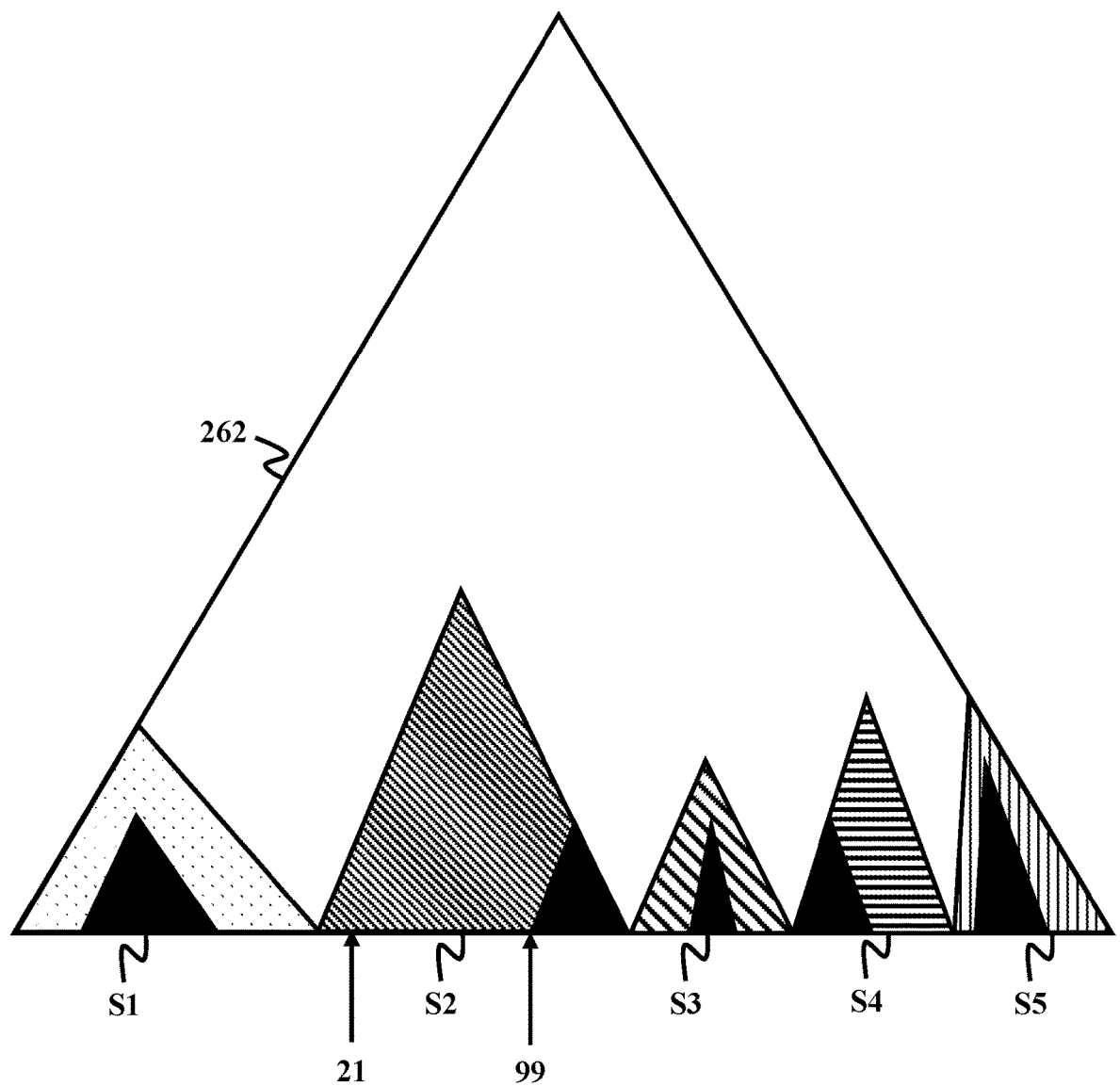
FIG. 2C illustrates an example of a blockchain enabled media key block showcasing encompassing triangle represents a tree, in accordance with embodiments of the present disclosure.

Looking now at FIG. 2C, illustrated an example of a blockchain enabled media key block 260 showcasing encompassing triangle represents a tree, in accordance with embodiments of the present disclosure. As depicted, the encompassing triangle 262 represents a tree (e.g., binary tree, tree of keys, etc.) that has been discussed throughout this disclosure. The triangle 262 encompasses subsets S1-S5, which are subsets of a media key block; as combined subsets S1-S5 are the entire media key block. As further depicted, each of the subsets S1-S5 spans a certain length, which is shown by the entirety of each subsets S1-S5 associated patterned triangles. The associated patterned triangles indicate a group of nodes/receivers that are covered by a respective subset S1-S5. Each of the subsets S1-S5 further include a solid black triangle with indicates revoked nodes, e.g., receivers/users that are not authorized to be able to access a particular media content. In some embodiments, each of the subsets S1-S5 is respectively associated with a particular media key block value that allows access to media content.

As a non-limiting example, the second subset S2, covers receivers 21 to 99, each of which can therefore extract a media key block value v2 (and only v2) from the media key block. The message that is encoded into the second subset S2 is the media key block value v2. It is noted that in some embodiments, the media key block value v2 could be a form/type of media key for decrypting and/or allowing for access media content.

Referring back now to the example, suppose a user is receiver 35, and suppose v2 is not directly usable for decryption of the media content. Receiver 35 would then provide for a blockchain transaction meaning "receiver 35—I need help processing media key block". The blockchain may respond with a single subset that either revokes receiver 35, or covers it, but may cover fewer (or more) nodes than the original second subset S2. If the receiver 25 is not revoked, receiver 35 can decrypt the message within and generate a new value y35. Now some pre-agreed function can combine the media key block value v2 and the new value y35 to compute a value v.2.35, which is some meaningful value that can decrypt the media content, such as, a media key, or precursor value (or some variant key) that unlocks a path that is already defined in the media content.

In some embodiments, another receiver can be made to compute a different value when it interacts with the blockchain, e.g., v.5.345 (value from subset S5, receiver 345) is different from v.2.35 (value from subset S2, receiver 35). In other embodiments, another receiver can be made to compute the same value when they interact with the blockchain, e.g., v.4.357 might compute equal to v.2.35. In some embodiments, the blockchain will compute different values for receivers even if they are within the same subset. It is noted that sub-setting the media key block and utilizing blockchain provides for the advantages of enhanced security and the enabling of real-time control over which values are given and to whom, which is extremely useful for real-time revocations and forensics.

Figure 2D:
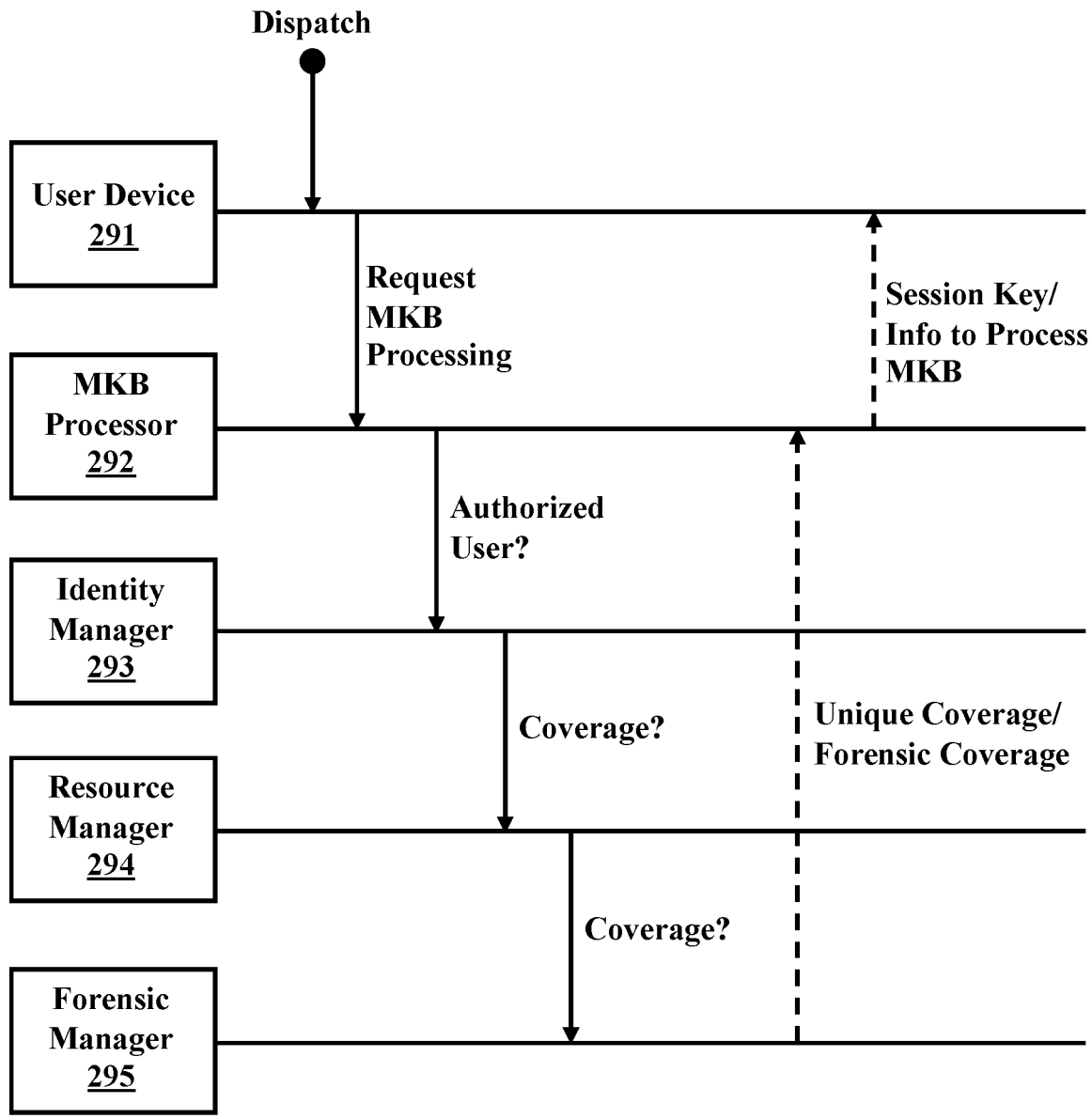
FIG. 2D illustrates an example of a blockchain transactional flow of distributing a media key block value to a user device, in accordance with embodiments of the present disclosure.

Turning now to FIG. 2D, illustrated is an example of a blockchain transactional flow 290 of distributing a media key block value to a user device, in accordance with embodiments of the present disclosure. In some embodiments, at dispatch the user device (e.g., smartphone, television, streaming device, etc.) 291 is put into a subset (such as one of the subsets S1-S5). After dispatch, the user device 291 may try to access a media content, upon trying to access the media content, a request for media key block processing may be sent to a media key block (MKB) processor 292.

The MKB processor 292 may then check with an identity manager 293 to determine if the user device 291 is an authorized user (e.g., is allowed to access the media content). If the user device 291 is not an authorized user, the user device 291 is denied access to the media content. If the user device 291 is an authorized user, the identity manager 293 communicates with a resource manager 294 to determine if the user device 291 is in a correct coverage (e.g., in a subset that can receive a media key value and/or the media content). If the user device 291 is not in a correct coverage, the user device 291 is denied access to the media content and/or the media key block value.

If the user device 291 is in a correct coverage, a user forensic manager 295 scans through a list of corrupted media key block values/keys and/or documented unauthorized receiver codes/values to determine if the user device 291 is covered by a corrupted value/key. If the user device 291 is covered by a corrupted value/key, the user device 291 is denied access the media content and is then added to the list in the forensic manager 295. If the user device 291 is not covered, the MKB processor 292 is relayed the information that there is not unique coverage (e.g., user device 291 has been revoked, etc.) and/or forensic coverage issues. The MKB processor 292 then provides a session key/information needed to process a media key block to the user device 291 and the user device 291 is not able to access the media content.

It is noted that each of the components 291-295 in the blockchain transactional flow 290 can be on/or a part of a blockchain network. It is further noted that the blockchain transactional flow 290 depicts a media key block distribution that is faster than traditional means as blockchain allows for the sub-setting of the media key block and billions of networked devices (e.g., the user device 291), thus only a small group of subset devices need be attended at one time with a certain value than all devices at one time.

Figure 3:
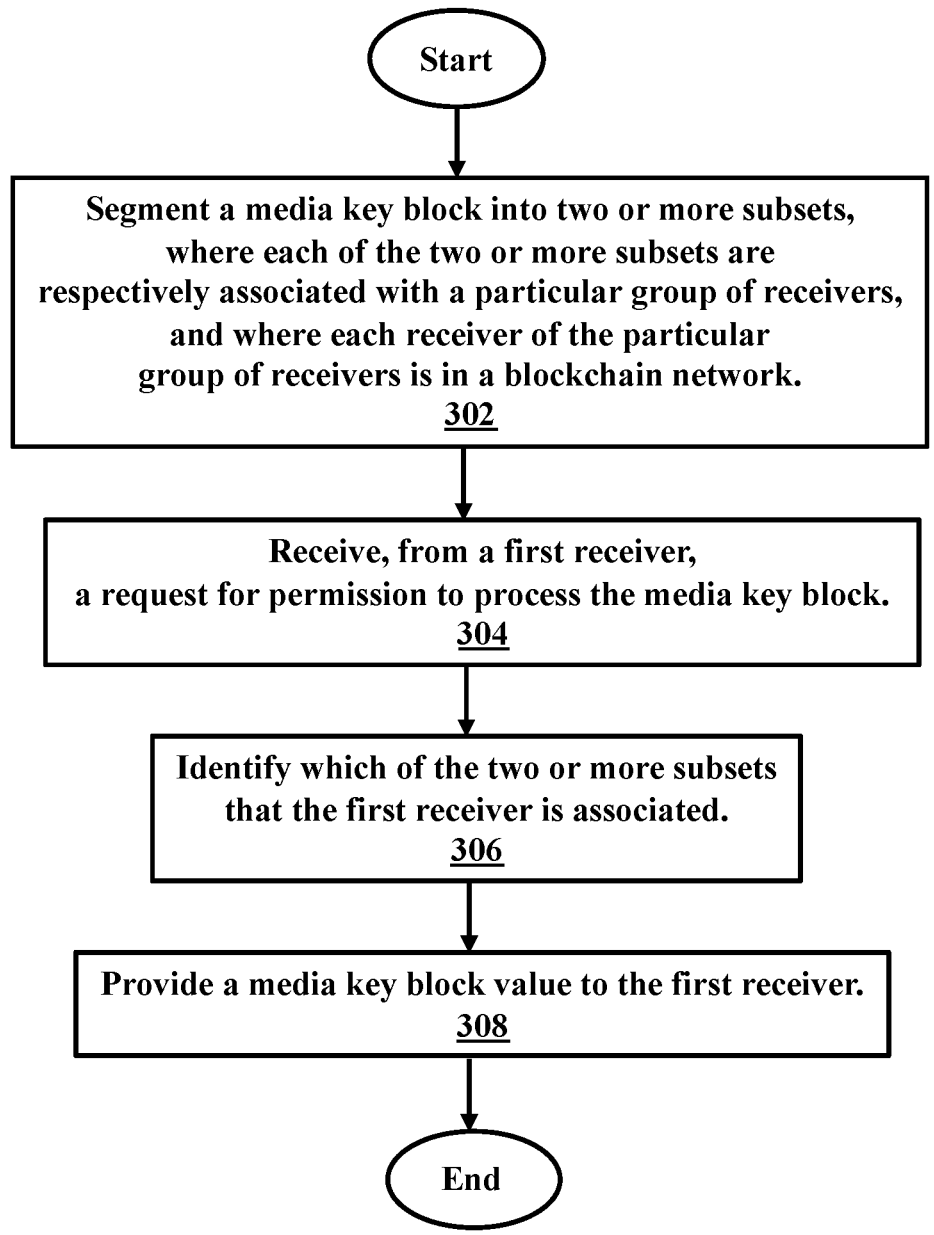
FIG. 3 illustrates a flowchart of an example method for a dynamic media key block, in accordance with embodiments of the present disclosure.

Referring now to FIG. 3, illustrated a flowchart of an example method 300 for a dynamic media key block. In some embodiments, the method 300 may be performed by a processor, node, and/or peer node in a blockchain network/system (such as the system 200 of FIG. 2A). In some embodiments, the method 300 begins at operation 302, where the processor segments a media key block into two or more subsets. Each of the two or more subsets may be respectively associated with a particular group of receivers. Each receiver of the particular group of receivers may be in a blockchain network.

In some embodiments, the method 300 proceeds to operation 304, where the processor may receive, from a first receiver, a request for permission to process the media key block. In some embodiments, the method 300 proceeds to operation 306, where the processor may identify which of the two or more subsets that the first receiver is associated. In some embodiments, the method 300 proceeds to operation 308, where the processor may provide a media key block value to the first receiver. In some embodiments, after operation 308, the method 300 may end.

In some embodiments, discussed below, there are one or more operations of the method 300 not depicted for the sake of brevity. Accordingly, in some embodiments, the media key block may be associated with a content. The content may be encrypted using a content key. The content key may be encrypted using one or more subset difference keys associated with the two or more sub sets.

In some embodiments, each of the two or more subsets may be further associated with respective particular media key block values. The media key block value provided to the first receiver may be associated with a first subset. That is, if the first receiver is in subset 100, the media key block value may be v100.

In some embodiments, identifying which of the two or more subsets that the first reviver is associated may include identifying a unique identification value associated with the first receiver. The unique identification value may indicate a placement of the first receiver in the two or more subsets (e.g., receiver 456 has a unique identification value of r.456).

In some embodiments, the media key block may be segmented into the two or more subsets based on content access (e.g., receiver 1 has access to a first content, whereas receiver 2 has access to a second content; or receiver 1 is authorized and receiver 2 is no longer authorized; etc.)

In some embodiments, the processor may provide one or more updates to the particular group of receivers based on which of the two or more subsets the particular group of receivers are associated. That is, receivers 1-25 are in subset 1, which allows access to a first movie, and receivers 26-50 are in subset 2, which allows access to a second movie. If only the first movie needs an update (e.g., addition of special scenes), then receives 1-25 in subset one receive the update. This is different than traditional media key blocks and broadcast encryption where all devices would be privy to the update, even if they could not utilize it.

In some embodiments, the processor may revoke access to a media based on the two or more subsets the particular group of receivers are associated. In some embodiments, the processor may not allow the particular group of receivers to view/access/utilize the media key block or media key block associated value.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4A:
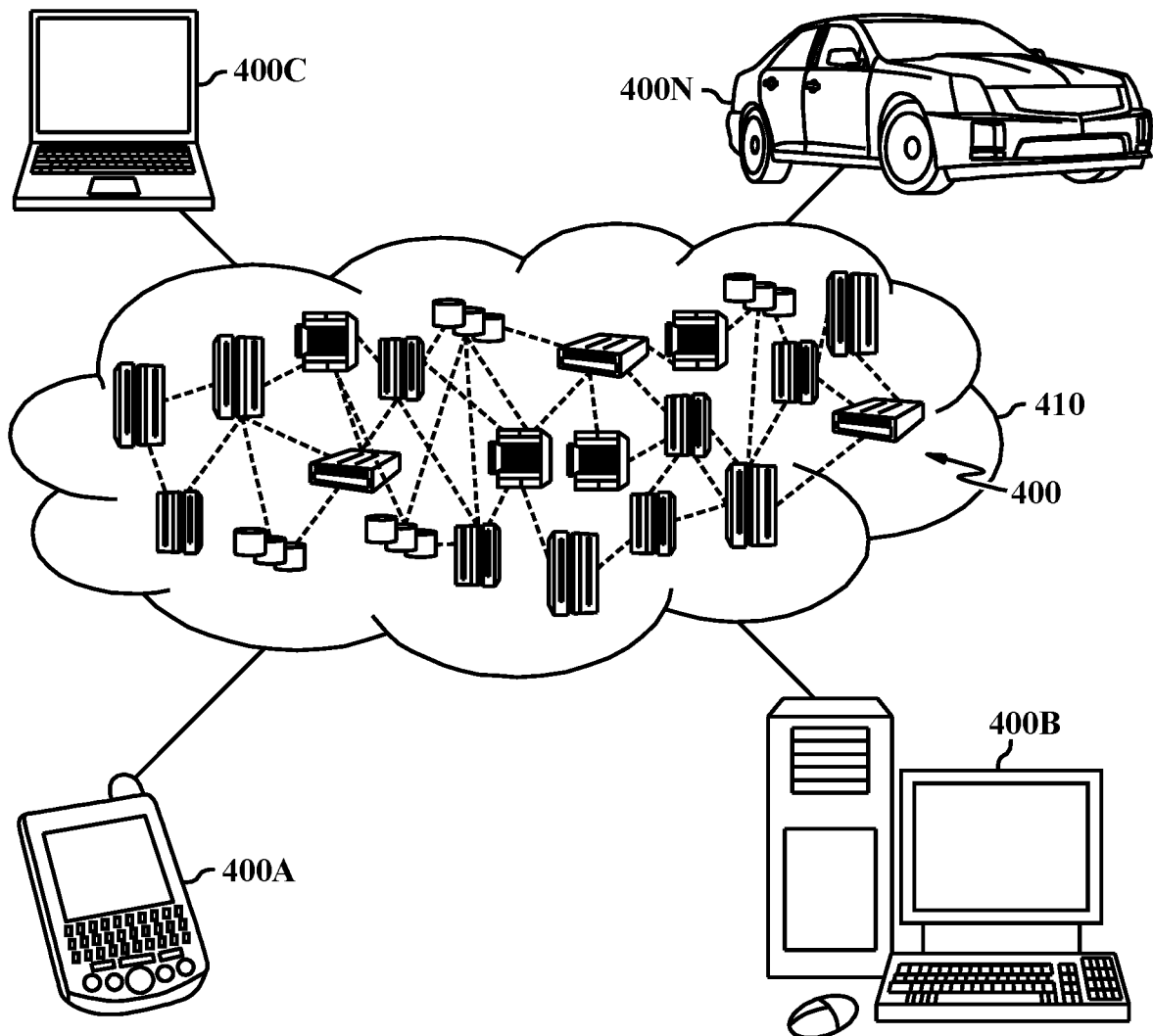
FIG. 4A illustrates a cloud computing environment, in accordance with embodiments of the present disclosure.

FIG. 4A, illustrated is a cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
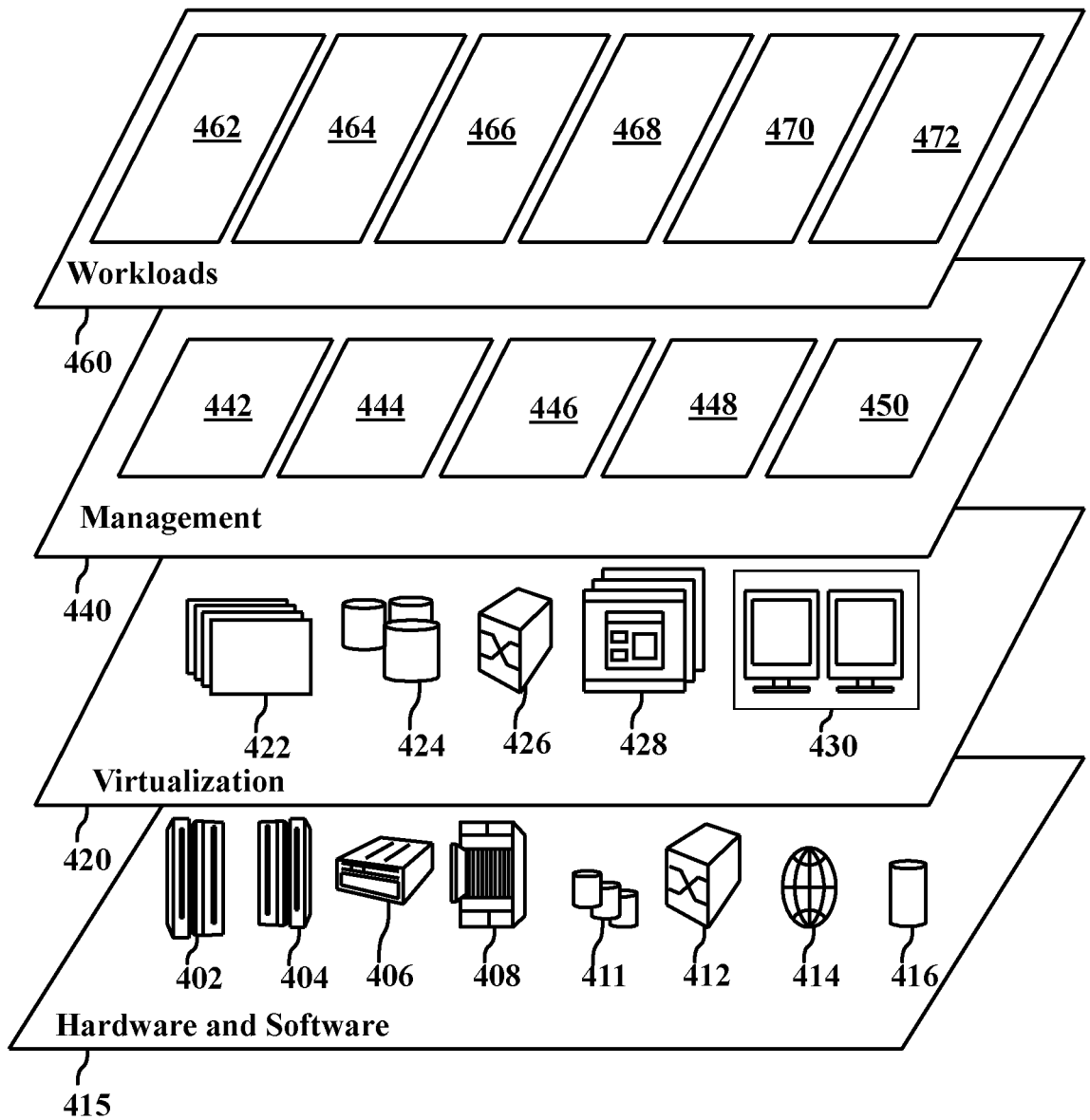
FIG. 4B illustrates abstraction model layers, in accordance with embodiments of the present disclosure.

FIG. 4B, illustrated is a set of functional abstraction layers provided by cloud computing environment 410 (FIG. 4A) is shown. It should be understood in advance that the components, layers, and functions shown in FIG. 4B are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture based servers 404; servers 406; blade servers 408; storage devices 411; and networks and networking components 412. In some embodiments, software components include network application server software 414 and database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and Pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and media key block value distribution 472.

Figure 5:
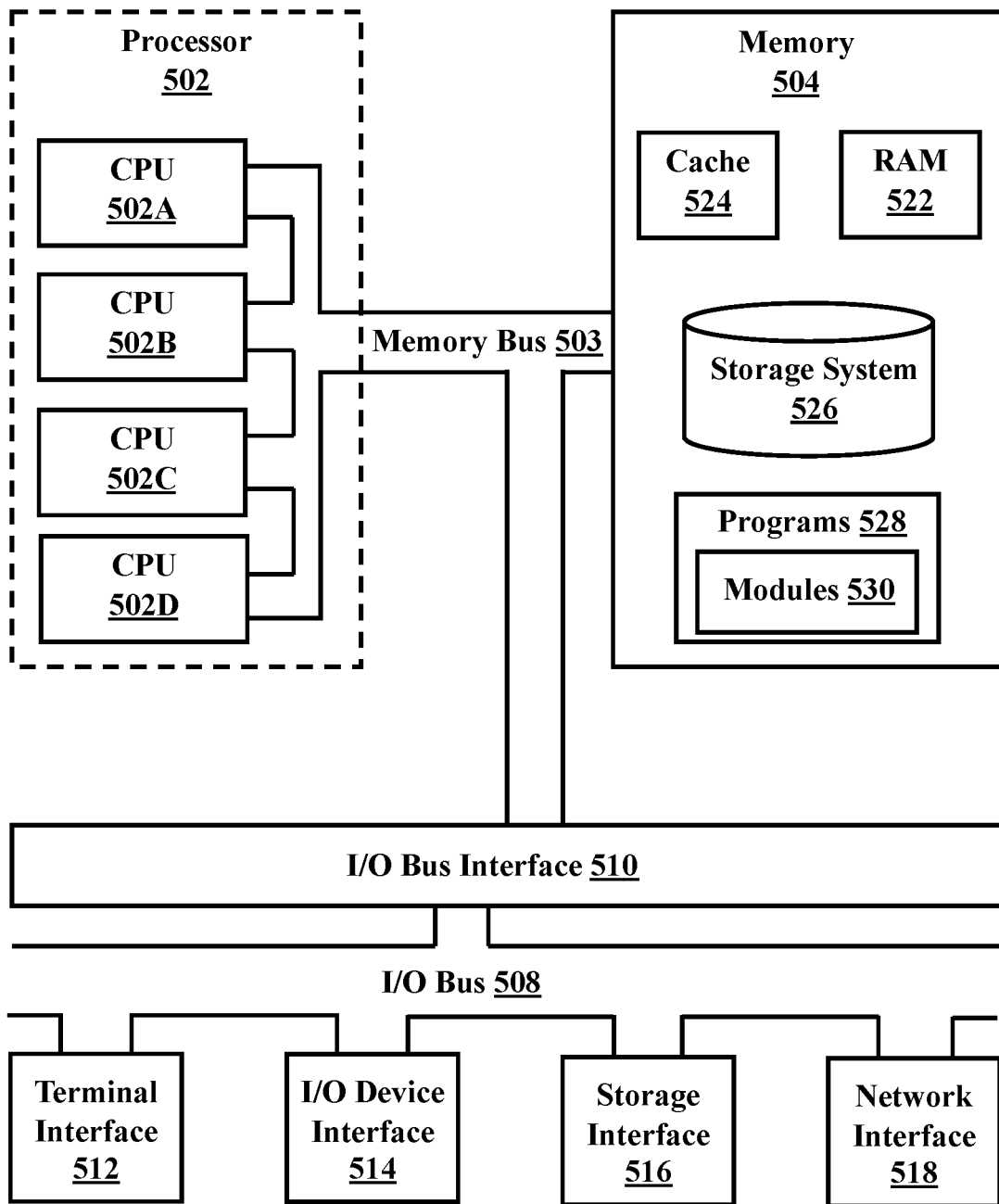
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for a dynamic media key block, the method comprising:
    segmenting a media key block into two or more subsets, wherein subsets of the two or more subsets are associated with particular content and a particular group of receivers, and wherein each receiver of the particular group of receivers is in a blockchain network;
    receiving, from a first receiver of the particular group of receivers, a request for permission to process the media key block and access the particular content associated with a first subset of the two or more subsets;
    identifying which of the two or more subsets that the first receiver is associated;
    based on determining that the first receiver is associated with the first subset, providing a media key block value to the first receiver for accessing the content associated with the first subset;
    based on determining that the first receiver is not associated with the first subset, providing the media key block value to the first receiver for generation of a combined media key block value, the combined media key block value generated via performing a function to the media key block value and a decrypted version of a message received from a second receiver within the blockchain network, the combined media key block value providing access to the content associated with the first subset; and
    adding at least one of the media key block value and the combined media key block value to a ledger associated with the blockchain network.

2. The method of claim 1, wherein the media key block is associated with a content, wherein the content is encrypted using a content key, wherein the content key is encrypted using one or more subset difference keys associated with the two or more subsets.

3. The method of claim 1, wherein each of the two or more subsets are further associated with respective particular media key block values, and wherein the media key block value provided to the first receiver is associated with a first subset.

4. The method of claim 1, wherein identifying which of the two or more subsets that the first receiver is associated includes identifying a unique identification value associated with the first receiver, wherein the unique identification value indicates a placement of the first receiver in the two or more subsets.

5. The method of claim 1, wherein the media key block is segmented into the two or more subsets based on content access.

6. The method of claim 5, further comprising:
providing one or more updates to the particular group of receivers based on which of the two or more subsets the particular group of receivers are associated.

7. The method of claim 5, further comprising:
revoking access to a media based on the two or more subsets the particular group of receivers are associated.

8. A system for a dynamic media key block, the system comprising:
a memory; and
a processor in communication with the memory, the processor being configured to perform operations comprising:
segmenting a media key block into two or more subsets, wherein subsets of the two or more subsets are associated with particular content and a particular group of receivers, and wherein each receiver of the particular group of receivers is in a blockchain network;
receiving, from a first receiver of the particular group of receivers, a request for permission to process the media key block and access the particular content associated with a first subset of the two or more subsets;
identifying which of the two or more subsets that the first receiver is associated;
based on determining that the first receiver is associated with the first subset, providing a media key block value to the first receiver for accessing the content associated with the first subset;
based on determining that the first receiver is not associated with the first subset, providing the media key block value to the first receiver for generation of a combined media key block value, the combined media key block value generated via performing a function to the media key block value and a decrypted version of a message received from a second receiver within the blockchain network, the combined media key block value providing access to the content associated with the first subset; and
adding at least one of the media key block value and the combined media key block value to a ledger associated with the blockchain network.

9. The system of claim 8, wherein the media key block is associated with a content, wherein the content is encrypted using a content key, wherein the content key is encrypted using one or more subset difference keys associated with the two or more subsets.

10. The system of claim 8, wherein each of the two or more subsets are further associated with respective particular media key block values, and wherein the media key block value provided to the first receiver is associated with a first subset.

11. The system of claim 8, wherein identifying which of the two or more subsets that the first receiver is associated includes identifying a unique identification value associated with the first receiver, wherein the unique identification value indicates a placement of the first receiver in the two or more subsets.

12. The system of claim 8, wherein the media key block is segmented into the two or more subsets based on content access.

13. The system of claim 12, wherein the operations further comprise:
providing one or more updates to the particular group of receivers based on which of the two or more subsets the particular group of receivers are associated.

14. The system of claim 12, wherein the operations further comprise:
revoking access to a media based on the two or more subsets the particular group of receivers are associated.

15. A computer program product for a dynamic media key block, the computer program product comprising a computer readable storage medium having program instructions embodied therewith, the program instructions executable by a processor to cause the processor to perform a function, the function comprising:
segmenting a media key block into two or more subsets, wherein subsets of the two or more subsets are associated with particular content and a particular group of receivers, and wherein each receiver of the particular group of receivers is in a blockchain network;
receiving, from a first receiver of the particular group of receivers, a request for permission to process the media key block and access the particular content associated with a first subset of the two or more subsets;
identifying which of the two or more subsets that the first receiver is associated;
based on determining that the first receiver is associated with the first subset, providing a media key block value to the first receiver for accessing the content associated with the first subset;
based on determining that the first receiver is not associated with the first subset, providing the media key block value to the first receiver for generation of a combined media key block value, the combined media key block value generated via performing a function to the media key block value and a decrypted version of a message received from a second receiver within the blockchain network, the combined media key block value providing access to the content associated with the first subset; and
adding at least one of the media key block value and the combined media key block value to a ledger associated with the blockchain network.

16. The computer program product of claim 15, wherein the media key block is associated with a content, wherein the content is encrypted using a content key, wherein the content key is encrypted using one or more subset difference keys associated with the two or more subsets.

17. The computer program product of claim 15, wherein each of the two or more subsets are further associated with respective particular media key block values, and wherein the media key block value provided to the first receiver is associated with a first subset.

18. The computer program product of claim 15, wherein identifying which of the two or more subsets that the first receiver is associated includes identifying a unique identification value associated with the first receiver, wherein the unique identification value indicates a placement of the first receiver in the two or more subsets.

19. The computer program product of claim 15, wherein the media key block is segmented into the two or more subsets based on content access.

20. The computer program product of claim 19, wherein the function further comprises:
   providing one or more updates to the particular group of receivers based on which of the two or more subsets the particular group of receivers are associated.

\* \* \* \* \*